United States Patent
Liu et al.

(10) Patent No.: US 11,477,328 B2
(45) Date of Patent: Oct. 18, 2022

(54) PTP-BASED AUDIO CLOCK SYNCHRONIZATION AND ALIGNMENT FOR ACOUSTIC ECHO CANCELLATION IN A CONFERENCING SYSTEM WITH IP-CONNECTED CAMERAS, MICROPHONES AND SPEAKERS

(71) Applicant: Plantronics, Inc., Santa Cruz, CA (US)

(72) Inventors: Yibo Liu, Reading, MA (US); Steven Potts, Andover, MA (US); Peter Chu, Lexington, MA (US); Richard Kos, Andover, MA (US); Gary Brown, Andover, MA (US); John Dietz, Andover, MA (US)

(73) Assignee: Plantronics, Inc., Santa Cruz, CA (US)

( * ) Notice: Subject to any disclaimer, the term of this patent is extended or adjusted under 35 U.S.C. 154(b) by 18 days.

(21) Appl. No.: 16/871,417

(22) Filed: May 11, 2020

(65) Prior Publication Data
US 2020/0358907 A1    Nov. 12, 2020

Related U.S. Application Data

(60) Provisional application No. 62/846,711, filed on May 12, 2019.

(51) Int. Cl.
*H04M 3/00*  (2006.01)
*H04M 5/00*  (2006.01)
(Continued)

(52) U.S. Cl.
CPC ............ *H04M 9/082* (2013.01); *G06F 3/162* (2013.01); *H04J 3/0667* (2013.01); *H04M 3/568* (2013.01)

(58) Field of Classification Search
CPC ...... H04M 9/082; H04M 3/568; H04M 3/002; H04M 9/08; H04M 1/6033; H04M 1/20;
(Continued)

(56) References Cited

U.S. PATENT DOCUMENTS 8,320,554 B1 * 11/2012 Chu .................. H04M 9/082
                                                    379/406.08
9,520,860 B2 * 12/2016 Whitehead ............... H03K 3/01
(Continued)

OTHER PUBLICATIONS

PCT/US2020/032372, International Search Report, dated Sep. 30, 2020.
(Continued)

*Primary Examiner* — Kharye Pope

(57) ABSTRACT

PTP timestamps are obtained and correlated to internal audio time and timestamps. This allows Ethernet/IP audio devices to be closely aligned with local digital audio devices to allow improved AEC operations. By performing repetitive PTP timestamps based on local audio time, drift between PTP time and local audio time is determined and corrected. By performing the PTP to local audio time operations on each independent Ethernet network, the Ethernet/IP audio devices can be split between independent LANs. If some local digital audio inputs formed from analog inputs are not aligned with other local digital audio inputs, signals can be provided in analog format and audio samples of the signals can be correlated to local audio time. With correlations performed as necessary based on the various audio inputs in use, high quality AEC operations are performed.

20 Claims, 9 Drawing Sheets

(51) Int. Cl.
*H04L 12/66* (2006.01)
*H04M 9/08* (2006.01)
*G06F 3/16* (2006.01)
*H04J 3/06* (2006.01)
*H04M 3/56* (2006.01)

(58) Field of Classification Search
CPC ......... H04M 2203/509; H04M 3/567; H04M 1/6016; H04M 7/006; H04R 1/406; H04R 3/02; H04R 2410/05; H04R 2499/11; H04R 3/00; H04R 2420/00; H04R 19/016; H04L 65/403; H04L 12/1827; H04L 65/605; H04L 1/20; H04L 65/1083; H04L 65/607; H04L 65/80; H04L 69/08; H04L 29/06; H04L 43/08; H04L 43/0823; H04L 7/0008
See application file for complete search history.

(56) References Cited

U.S. PATENT DOCUMENTS

| | | | | |
|---|---|---|---|---|
| 10,297,266 | B1* | 5/2019 | Burenius | G10L 21/0232 |
| 2009/0222589 | A1* | 9/2009 | Kirsch | H04J 3/0676 |
| | | | | 709/248 |
| 2010/0189206 | A1* | 7/2010 | Kagan | H04J 3/0697 |
| | | | | 375/354 |
| 2010/0235486 | A1* | 9/2010 | White | H04N 21/4305 |
| | | | | 709/248 |
| 2014/0154968 | A1 | 6/2014 | Root et al. | |
| 2014/0269778 | A1* | 9/2014 | Yang | H04J 3/0697 |
| | | | | 370/503 |
| 2015/0318977 | A1* | 11/2015 | Gelter | H04N 21/2381 |
| | | | | 709/231 |
| 2016/0014373 | A1 | 1/2016 | LaFata et al. | |
| 2016/0095075 | A1* | 3/2016 | Bin Sediq | H04W 56/001 |
| | | | | 370/350 |
| 2016/0099803 | A1* | 4/2016 | Achanta | H04L 63/14 |
| | | | | 375/355 |
| 2016/0112482 | A1* | 4/2016 | Iyengar | H04N 7/142 |
| | | | | 709/204 |
| 2016/0301831 | A1* | 10/2016 | Meyer | H04J 3/0667 |
| 2017/0041357 | A1* | 2/2017 | Wang | H04L 65/4015 |
| 2017/0289231 | A1* | 10/2017 | Powell | H04L 65/601 |
| 2018/0217805 | A1* | 8/2018 | Uong | H04R 3/00 |
| 2019/0102108 | A1* | 4/2019 | Schalk-Schupp | G06F 3/0659 |
| 2019/0342658 | A1* | 11/2019 | Kirkpatrick | H04R 1/406 |
| 2020/0265859 | A1* | 8/2020 | LaBosco | H04L 65/403 |

OTHER PUBLICATIONS

PCT/US2020/032372, Written Opinion of the International Searching Authority, dated Sep. 30, 2020.

Intel Corp., Intel Ethernet Controller I210 Datasheet, Rev. 3.6, Oct. 2020.

Intrinsyc Technologies Corp., Open-Q 835 µSystem on Module datasheet, 2019.

NVidia Corp., nVidia Jetson TX1 System-on-Module datasheet, Nov. 22, 2016.

Qualcomm Technologies, Inc., Qualcomm Snapdragon 835 Mobile Platform datasheet, 2017.

NVidia Corp., nVidia Tegra X1 Mobile Processor Technical Reference Manual, Apr. 23, 2019.

Qualcomm Technologies, Inc., WCD Audio Codec Device Specification, Feb. 8, 2018.

* cited by examiner

US 11,477,328 B2

PTP-BASED AUDIO CLOCK SYNCHRONIZATION AND ALIGNMENT FOR ACOUSTIC ECHO CANCELLATION IN A CONFERENCING SYSTEM WITH IP-CONNECTED CAMERAS, MICROPHONES AND SPEAKERS

CROSS-REFERENCE TO RELATED APPLICATIONS

This application claims priority from U.S. Provisional Application No. 62/846,711, filed on May 12, 2019, which is hereby incorporated by reference.

BACKGROUND

Typically, the microphones, speakers and cameras of a conferencing endpoint are directly wired to a processing unit, often called a codec. This direct wiring provides the processing unit very precise knowledge of the timings of the various signals from and to the various peripheral devices. However, this direct wiring also complicates installation flexibility of the conferencing endpoint. There must be the possibility to run cables between the codec and the microphones, speakers and cameras. This can result in inconvenient placement of the various devices and visibility of unsightly cables.

In video and audio conferencing, acoustic echo cancellation (AEC) is used for removing echo. For AEC to be working properly, the input microphone audio and reference speaker audio need to be synchronized to a sampling clock and aligned in time. This requirement can be easily achieved when the microphone and speaker devices are analog or digital devices that are directly wired to or integrated with the processing unit, as then they are normally driven by the same audio clock.

SUMMARY

In embodiments according to the present invention, precision time protocol (PTP) timestamps are obtained and correlated to internal or local audio time and timestamps. This allows Ethernet/IP connected audio devices to be closely aligned with local digital audio devices, such as I2S devices, to allow improved AEC operations. By performing repetitive PTP timestamps based on local audio time, clock drift between PTP time and local audio time is determined and corrected. By performing the PTP to local audio time operations on each independent Ethernet network, the Ethernet/IP audio devices can be split between independent LANs. If some local digital audio inputs are not aligned with other local digital audio inputs, such as local digital audio inputs formed from analog inputs, signals can be provided in analog format and audio samples of the signals can be correlated to local audio time. With these various correlations performed as necessary based on the various audio inputs in use, high quality AEC operations are performed as time skews are less than the 0.1 ppm needed.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

Figure 1:
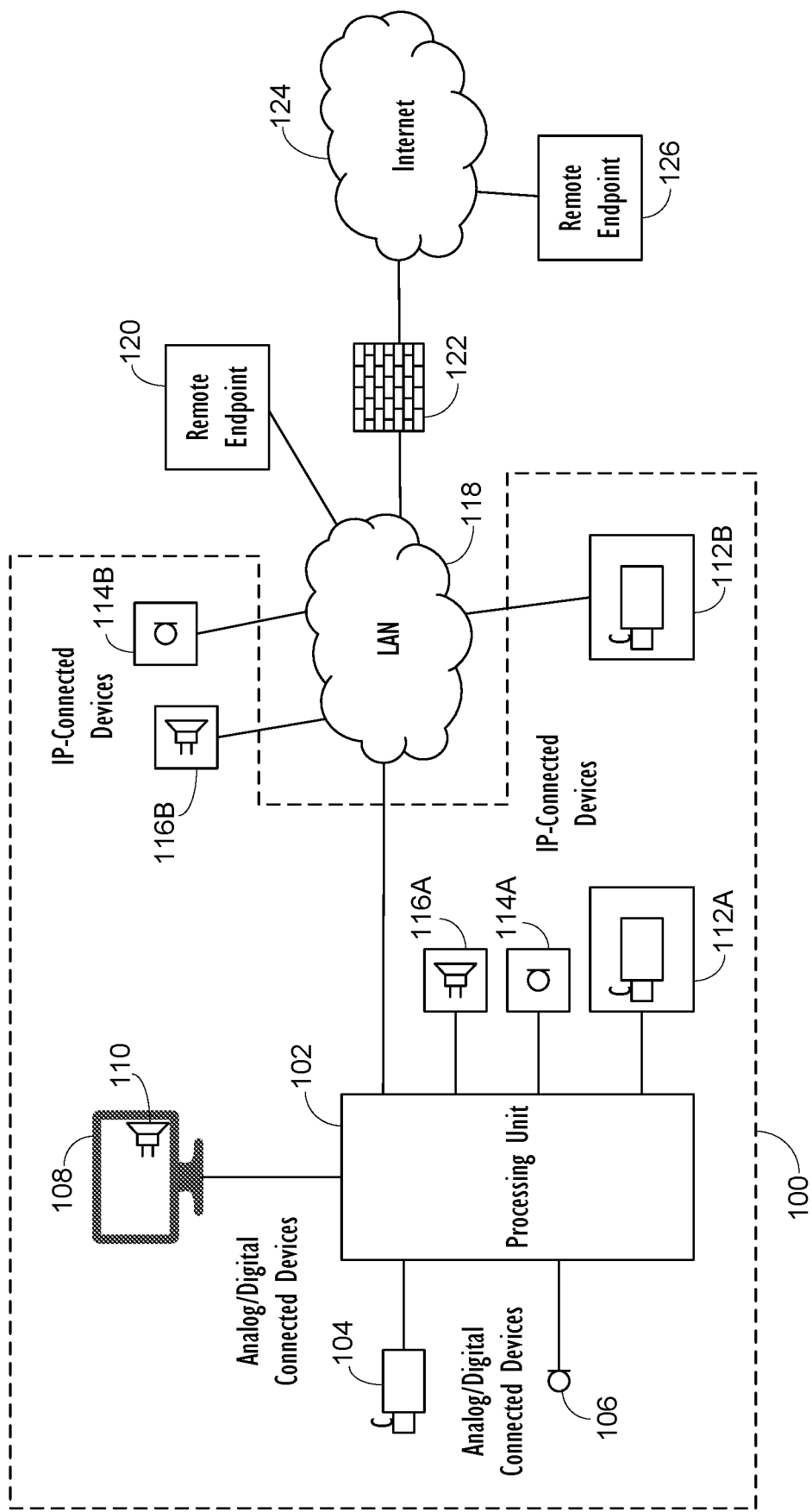
FIG. 1 is a block diagram of an IP-connected conferencing endpoint according to the present invention.

FIG. 1 illustrates an exemplary video endpoint 100 according to the present invention. A processing unit 102, often referred to as a codec, performs the necessary processing. Local analog and digital connected cameras 104 and microphones 106 are connected directly to the processing unit 102 in a manner similar to the prior art. A television or monitor 108, including a loudspeaker no, is also connected to the processing unit 102 to provide local video and audio output. Additional monitors can be used if desired to provide greater flexibility in displaying conference participants and conference content.

In addition to the local analog and digital connected cameras 104 and microphones 106, the endpoint 100 of FIG. 1 includes the capability of operating with cameras 112A, 112B, microphones 114A, 114B and speakers 116A, 116B that are connected using an Internet Protocol (IP) Ethernet connection, rather than the prior art analog and digital connections. The Ethernet/IP-connected devices can be locally connected or can be connected to a corporate or other local area network (LAN) 118. A remote endpoint 120 can be located on the LAN 118. The LAN 118 is connected to a firewall 122 and then the Internet 124 in a common configuration to allow communication with a remote endpoint 126. Both the LAN-connected remote endpoint no and the Internet-connected remote endpoint 126 are considered far end endpoints.

Figure 2:
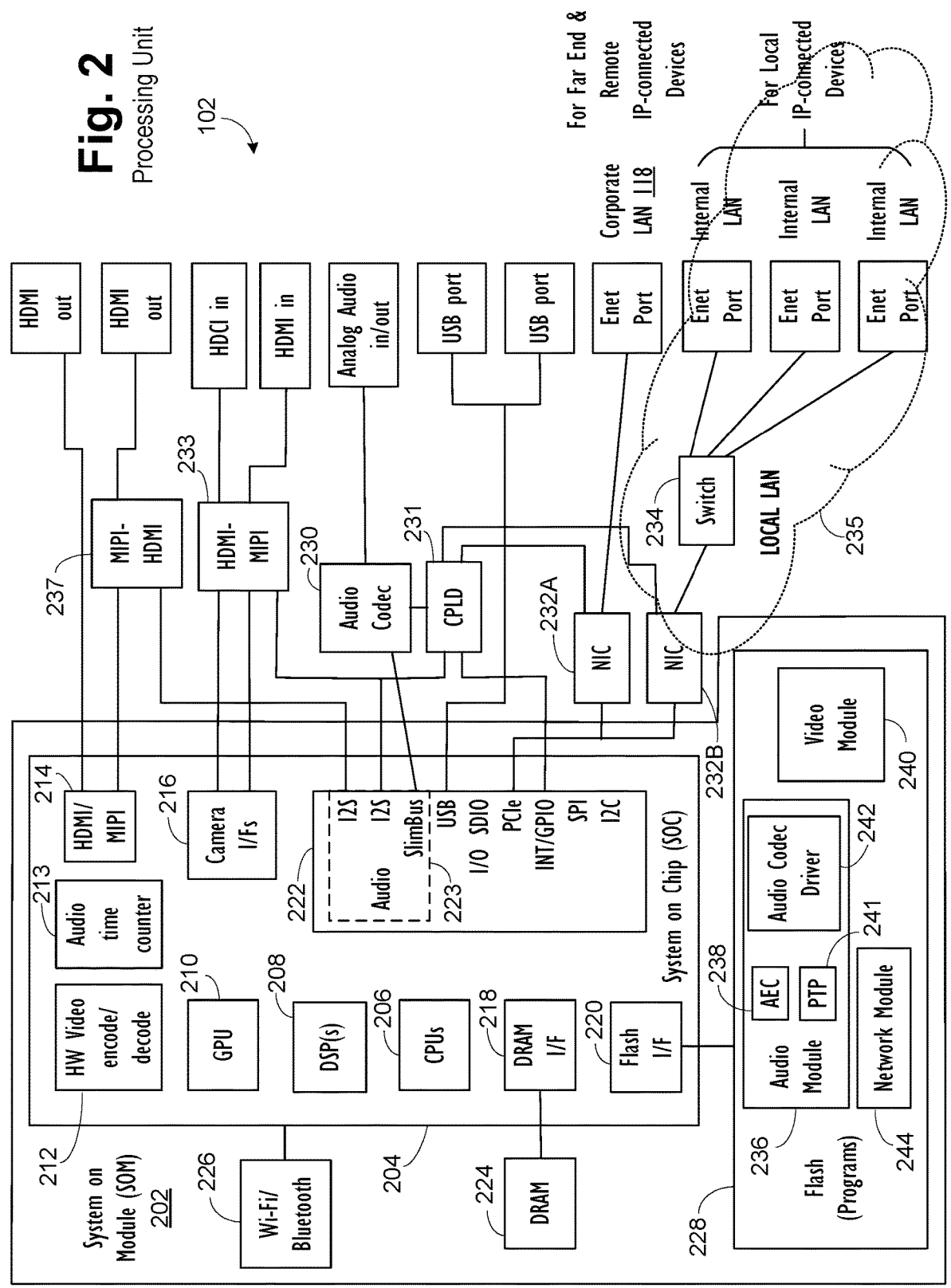
FIG. 2 is a block diagram of a processing unit of FIG. 1 according to the present invention.

Details of the processing unit 102 of FIG. 1 are shown in FIG. 2. In the illustrated example a system on module (SOM) 202 is the primary component of the processing unit 102. Exemplary SOMs are the nVidia® Jetson TX1 and the Intrinsyc™ Open-Q™ 835 micro System on Module. The SOM 202 is often developed using a system on a chip (SOC) 204, such as an SOC used for cellular telephones and handheld equipment, such as a Tegra® X1 from Nvidia® in the Jetson TX1 or Qualcomm® 835 in the Open-Q 835. The SOC 204 contains CPUs 206, DSP(s) 208, a GPU 210, a hardware video encode and decode module 212, an HDMI (High-Definition Multimedia Interface) output module 214, a camera inputs module 216, a DRAM (dynamic random access memory) interface 218, a flash memory interface 220 and an I/O module 222. The CPUs 206, the DSP(s) 208 and the GPU 210 are generically referred to as the processor in this description for ease of reference. A local audio time counter 213 is provided to maintain an internal audio time and is driven by an internal clock. The HDMI output module 214 is connected to a MIPI (Mobile Industry Processor Interface) to HDMI converter 237 to provide one HDMI output, with the SOC 204 directly providing one HDMI output. An HDMI to MIPI converter module 233 is connected to receive HDMI and HDCI (High Definition Camera Interface) cameras signals and provide the outputs to the camera inputs module 216. The I/O module 222 includes an audio input module 223 that provides audio inputs and outputs, such as I2S (Inter-IC Sound) signals; USB (Universal Serial Bus) interfaces; an SDIO (Secure Digital Input Output) interface; PCIe (Peripheral Component Interconnect express) interfaces; an SPI (serial peripheral interface) interface; an I2C (Inter-Integrated Circuit) interface and various general purpose I/O pins (GPIO). DRAM 224 and a Wi-Fi®/Bluetooth® module 226 are provided on the SOM 202 and connected to the SOC 204 to provide the needed bulk operating memory (RAM associated with each CPU and DSP is not shown, as is RAM generally present on the SOC itself) and additional I/O capabilities commonly used today.

Flash memory 228 is connected to the SOC 204 to hold the programs that are executed by the processor, the CPUs, DSPs and GPU, to provide the endpoint functionality and portions of the PTP to audio clock synchronization according to the present invention. The flash memory 228 contains software modules such as an audio module 236, which itself includes an acoustic echo canceller (AEC) module 238, a PTP module 241 and an audio codec driver 242; a video module 240; and a network module 24. The audio module 236 contains programs for other audio functions, such as various audio codecs, beamforming, and the like. The video module 240 contains programs for other video functions, such as any video codecs not contained in the hardware video encode and decode module 212. The network module 244 contains programs to allow communication over the various networks, such as the LAN 118, a Wi-Fi network or a Bluetooth network or link.

An audio codec 230 is connected to the SOM 202 to provide local analog line level capabilities. In one embodiment, the audio codec is the Qualcomm® WCD9335. In at least one example of this disclosure, two Ethernet controllers or network interface chips (NICs) 232A, 232B, such as Intel® I210-AT or other chips compliant with the IEEE 1588 PTP, are connected to the PCIe interface. In the example illustrated in FIG. 2, one NIC 232A is for connection to the corporate LAN, while an Ethernet switch 234 is connected to the other NIC 232B to allow for local connection of Ethernet/IP-connected devices over a local LAN 235 formed by the switch 234. A CPLD (complex programmable logic device) 231 is connected to the audio codec 230, the NICs 232A, 232B and the SOC 204 for providing signals used in the PTP operations. More details are provided below.

As discussed above, for AEC to be working properly, the input microphone audio and reference speaker audio need to be synchronized to a sampling clock and aligned in time. This becomes challenging when the microphones and speakers are IP-connected devices connected over an Ethernet link. For Ethernet/IP-connected microphones or speakers, each device has its own crystal, and the audio clocks between them are not synchronized or time aligned. According to present invention, a PTP (Precision Time Protocol) such IEEE 1588 is used to correlate the audio clock and high precision timestamps are used to align audio data from the different devices.

It is understood that the use of an SOM and an SOC is one embodiment and other configurations can readily be developed, such as placing equivalent components on a single printed circuit board or using different Ethernet controllers, SOCs, DSPs, CPUs, audio codecs and the like.

Figure 3:
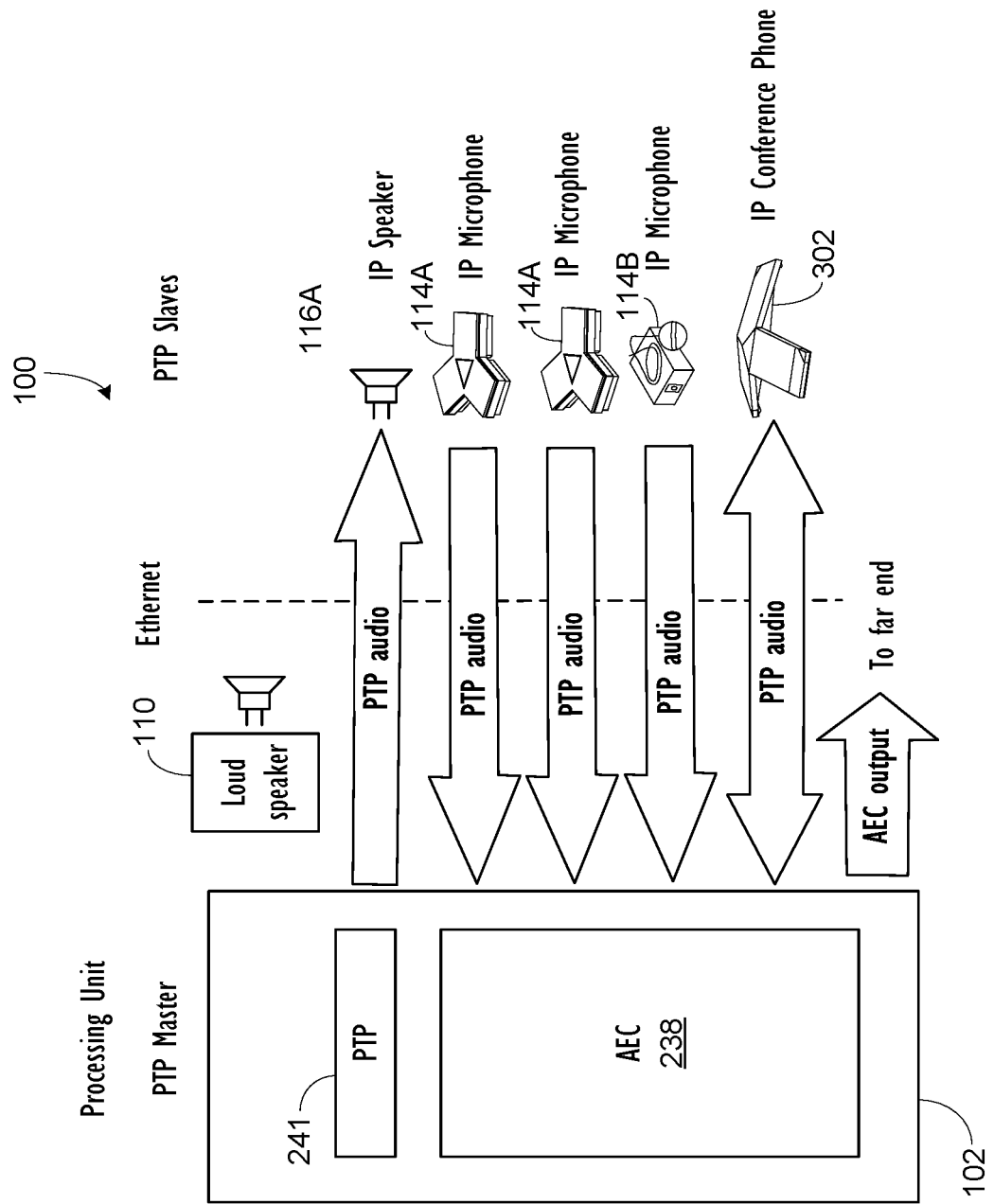
FIG. 3 is a block diagram of audio flows in the conferencing endpoint of FIG. 1.

FIG. 3 shows typical audio devices that are connected to a conference endpoint via Ethernet connections, which then need PTP-based alignment to perform acoustic echo cancellation. The processing unit 102 includes the AEC module 238 and the PTP module 241. The loudspeaker no is connected to the processing unit 102. PTP audio is provided to the Ethernet/IP speaker 116A. PTP audio is received from the Ethernet/IP microphones 114A and 114B. PTP audio is exchanged with an IP conference phone 302. AEC audio is provided to the far end, such as remote endpoints 120, 126. PTP audio is used with the various Ethernet/IP devices to allow the audio clocks to be aligned to allow proper acoustic echo cancellation.

Figure 4:
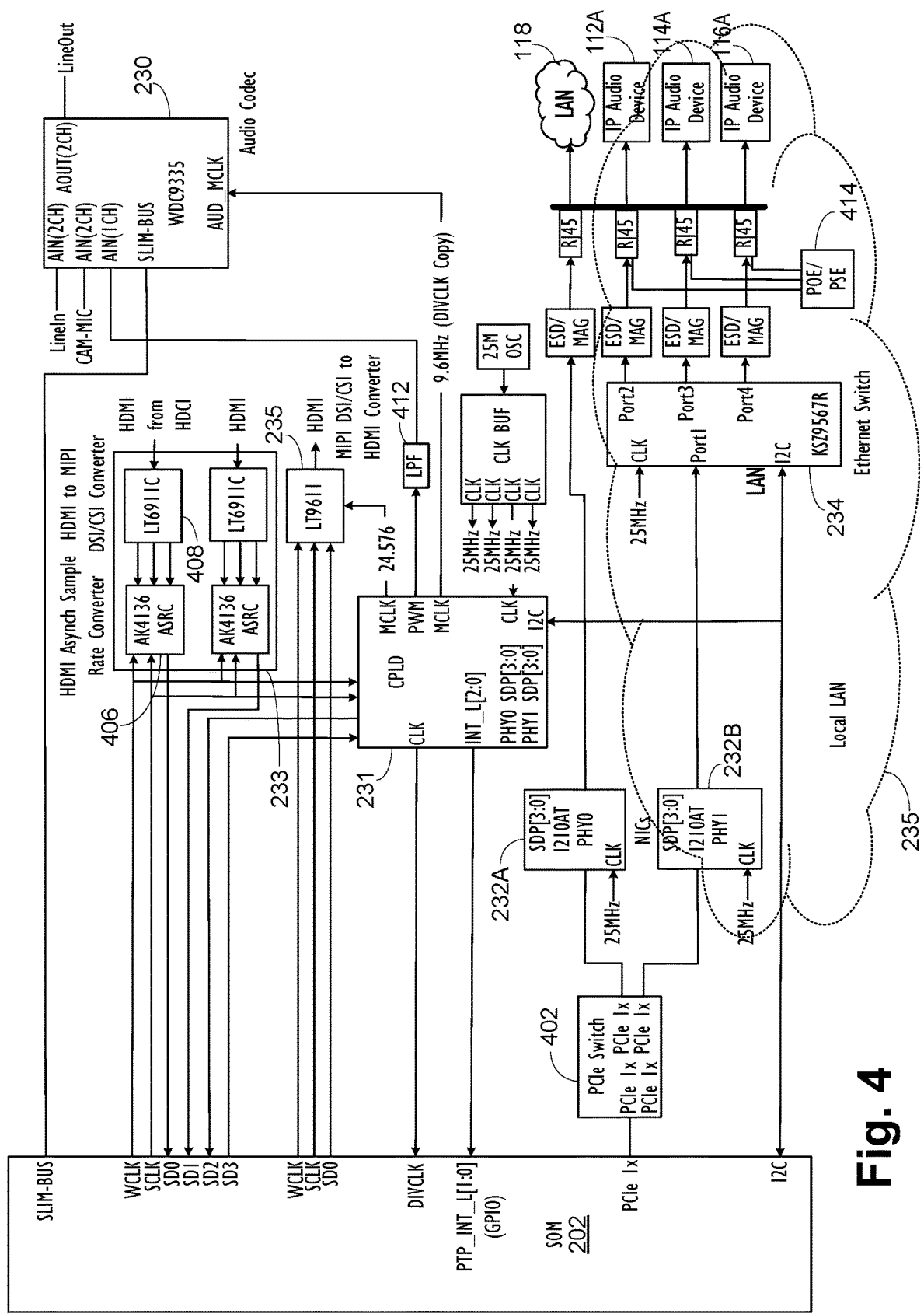
FIG. 4 is a more detailed block diagram of the audio portions of FIG. 2 according to the present invention.

Referring now to FIG. 4, a more detailed drawing of the audio components of the processing unit 102 is shown. Additional components and connections used in the illustrated embodiment to time align the audio clocks are illustrated. The NICs 232A, 232B share a 25 MHz input clock, thus providing a common time base which can prevent certain types of PTP drift issues. The CPLD 231 is provided to perform certain miscellaneous functions to aid in the PTP and audio time synchronization operations. Various connections of the CPLD 231 are discussed below. A PCIe switch 402 interfaces between the SOM 202 and the NICs 232A, 232B. To receive HDMI® inputs, a pair of HDMI to MIPI DSI/CSI converters 408 are provided. These converters 408 connect to asynchronous sample rate converters (ASRCs) 406, which receive the audio streams and convert to the local sample rate and clock for use by the SOC 204. The ASRCs 406 receive clocks from the SOM 202 and provide the audio streams from any microphones associated with the connected cameras. The HDMI to MIPI DSI/CSI converters 408 and the ASRCs 406 form the HDMI to MIPI converter module 233. A MIPI DSI/CSI to HDMI converter 237 receives clocks and an audio output from the SOM 202 and provides an HDMI output for use with the monitor 108.

The illustrated processing unit 102 is intended to operate as either a codec for communication with a far end or as a content pod, for local and far end content, such as done by a device such as the Polycom® Pano™. As such, each of the NICs 232A, 232B is capable of operating as either a PTP Master or PTP Slave device.

The following Table 1 indicates possible configurations and functions.

TABLE 1

| Scenario | Local LAN 235 | Corp. LAN 118 | Description |
|---|---|---|---|
| 1 | Master | — | Processing unit 102 is used as Primary Codec with A/V peripherals only on local LAN 235 |
| 2 | Slave | — | Processing unit 102 is used as Content Pod on local LAN 235 along with other AV peripherals |
| 3 | Master | Master | In this case IP-connected devices exist on both the local LAN 235 and the Corporate LAN 118. For example, there is an existing Polycom ® Trio ™ in the room connected to the local network 235. |
| 4 | Master | Slave | Unlikely scenario but possible if used in an environment where the processing unit 102 must interact with other AV equipment and there is a Preferred Grand Master on the Corporate LAN 118. |

Both NICs 232A, 232B expose four Software Definable Pins (PHYx_SDP[0-3]) which may be individually configured to supplement PTP functionality. These pins may be used as inputs or outputs depending on their function. A summary of the functionality follows.

1. Generate PTP Synchronized Level Change Output—SDP pin toggles based on a PTP time value. This is a one-shot event.

2. Generate PTP Synchronized Pulse Output—SDP pin generates a pulse of programmable start and duration based on a PTP time value.

3. Generate PTP Synchronized Clock Output (up to 2)—SDP pin generates a repetitive output clock based on PTP time.

4. Generate PTP Synchronized Time Stamp—SDP pin captures the PTP time based on an external transition of the input and generates a PCIe interrupt.

All SDP pins are connected to the CPLD 404 to facilitate a variety of implementation options.

The Intel I210-AT provides two auxiliary time-stamp registers. These may be used in conjunction with the SDP pins to capture the PTP time at which an event occurred. Time-stamp data is held in these registers until another event occurs. This feature is used correlate external events to PTP time in a present embodiment.

The managed switch 234 provides a private network interface for local Ethernet/IP-connected devices, limiting the amount of congestion and simplifying discovery, pairing and security issues. The switch 234 preferably supports PTP. Management is performed via I2C or in-band on any port.

There are two cases to be considered with respect to the managed switch 234.

1. The NIC 232B is the PTP Grand Master for the local LAN 235. The internal facing switch port would subsequently be a PTP slave. The outward facing ports would be considered PTP masters to the downstream slave devices.

2. One of the devices on a local LAN port has resolved to be the Preferred Grand Master. The internal NIC 232B must assume a slave mode role along with the other two outward facing ports. An example of this is a dual endpoint configuration when one is used as a codec and the other as a content device. The local LAN switches 234 could then cascade, providing two additional AV ports to the processing unit 102.

The following description focuses on the Open-Q 835 embodiment. As the specific components on the Jetson TX1 are different, there are some architectural and operational differences, including in the audio subsystems. In some aspects, the Jetson TX1 embodiment for PTP and audio packet timing might be simpler as the Jetson TX1 can operate its digital audio interface in slave mode, receiving its timing from an external source, such as an external phase-locked loop (PLL) which is synchronized to the PTP clock, allowing the local audio clock domain to be physically slaved to the PTP clock and provides multiple I2S interfaces which can be operated in TDM mode, for easier interfacing to conventional devices. After reviewing the description below, one skilled in the art will be able to apply the teachings to the Jetson TX1 or successors or other SOMs with different architectures and configurations.

The Open-Q 835 must always operate as the local audio timing master, precluding the use of a PTP-derived base clock. This means that the software must implement an asynchronous sample rate converter (ASRC), the resampler in the PTP module 241, to convert sample rates between an onboard clock domain used to develop the audio time of the audio time counter 213 and the Ethernet or IP Audio (PTP) clock domain. The resampler in the PTP module 241 performs periodic adjustments by algorithmically adding or dropping audio samples to maintain the synchronization between the audio time base and the PTP time domain.

The Open-Q 835 provides both I2S and MIPI SLIMBus interfaces, allowing direct connection of a WCD9335 audio codec. Although the fundamental timing is derived from the same base clock, the relationship (skew) and packet delay is undefined.

There are several paths for audio I/O to take in the Open-Q 835-based embodiment. The primary analog I/O is thru the WCD9335, the preferred audio codec 230 for the Open-Q 835 embodiment. The interface to the WCD9335 is a MIPI® SLIMbus®. To address the potential skew or delay issues mentioned above, the described Open-Q 835 embodiment provides a signal from the CPLD 231 to an unused channel on the audio codec 230, such as the AIN5 input. This signal is generated based on a PTP packet synchronization event, such as a programmable word clock (WCLK) count. The CPLD 231 either provides a pulse on this signal which coincides with the PTP event toggle (described below) or via a PWM/LPF (pulse width modulation/low pass filter) whose zero crossing coincides with this event.

Of all the digital audio I/O available on the 835, the Open-Q 835 embodiment only exposes two I2S interfaces. Both interfaces operate in master mode and the data lines may be individually programmed as either stereo inputs or outputs. The first I2S interface is a quad interface supporting up to 4 stereo channels. The second I2S interface provides only a single stereo data line.

For the quad interface, three of these channels are preferably programmed as audio inputs. SD0 and SD1 come from the ASRCs 406. These ASRCs 406 take stereo data from the HDMI to MIPI converters 408 and convert them to the native clock domain using the 48 KHz WCLK and 1.532 MHz SCLK. The SD2 input is used as the flag channel for PTP time synchronization and is driven by the CPLD 231. SD3 is connected to the CPLD 231 to provide additional flexibility in handling audio synchronization. The second I2S interface is connected to the audio input of the MIPI to HDMI converter 237.

The audio samples received over the I2S and SLIMbus interfaces are transferred by direct memory access (DMA) into an area of memory reserved as the audio sample buffer. The I2S and SLIMbus interface samples are provided to respective queues in the audio sample buffer. The I2S samples are time aligned in the audio sample buffer and the SLIMbus samples are time aligned in the audio sample buffer. Similarly, audio samples from the NICs 323A, 232B are also transferred into the audio sample buffer in respective queues for each Ethernet/IP-connected device. The Ethernet/IP audio samples are time aligned in the audio sample buffer and each contains a PTP timestamp. While the I2S samples are time aligned to each other, the SLIMbus samples are time aligned to each other and the Ethernet/IP samples are time aligned to each other, none of the sample types, I2S, SLIMbus or Ethernet/IP, are aligned with any other sample types.

Figure 5:
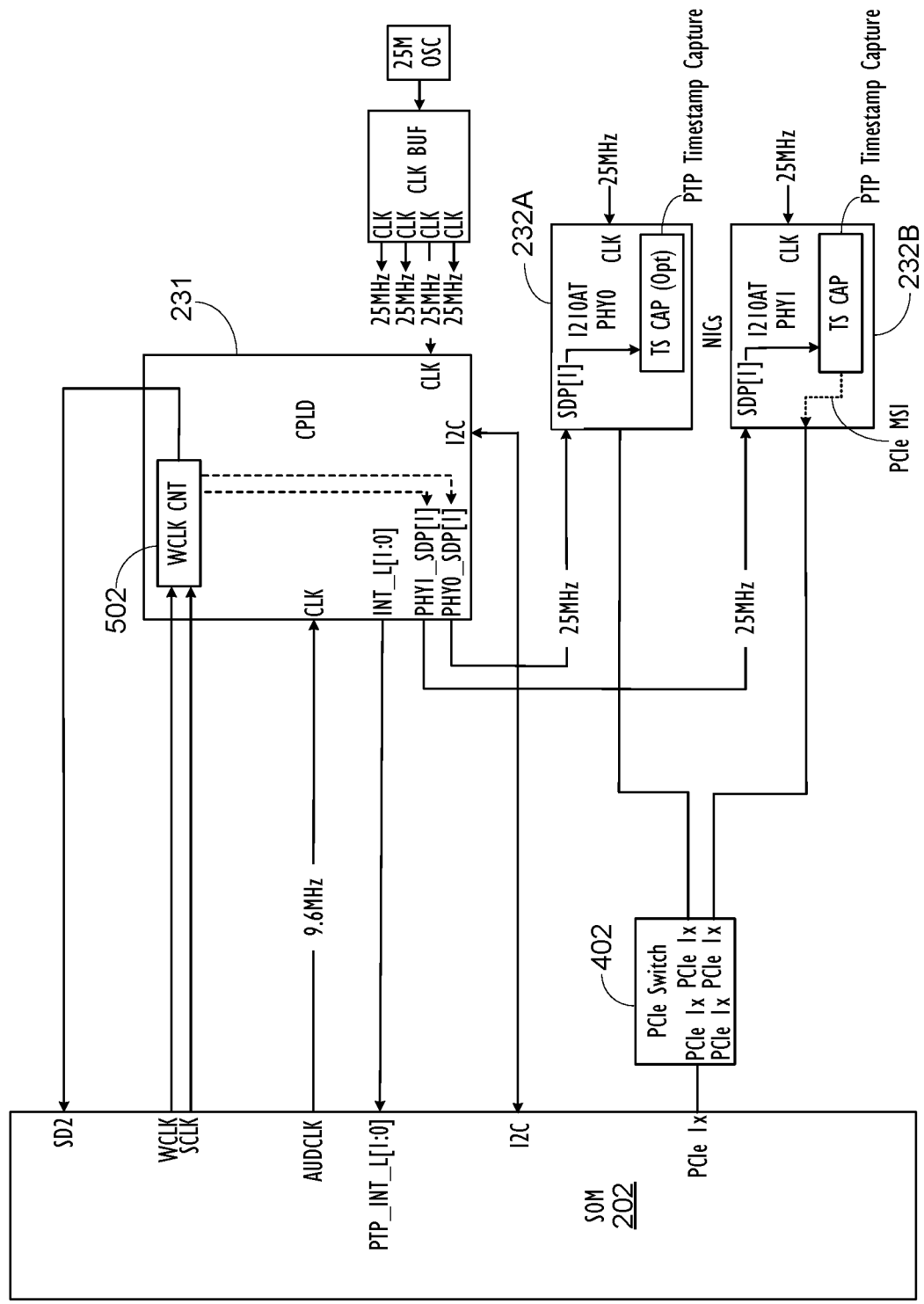
FIG. 5 is a portion of FIG. 4, illustrating PTP timestamp capture according to the present invention.
Figure 6:
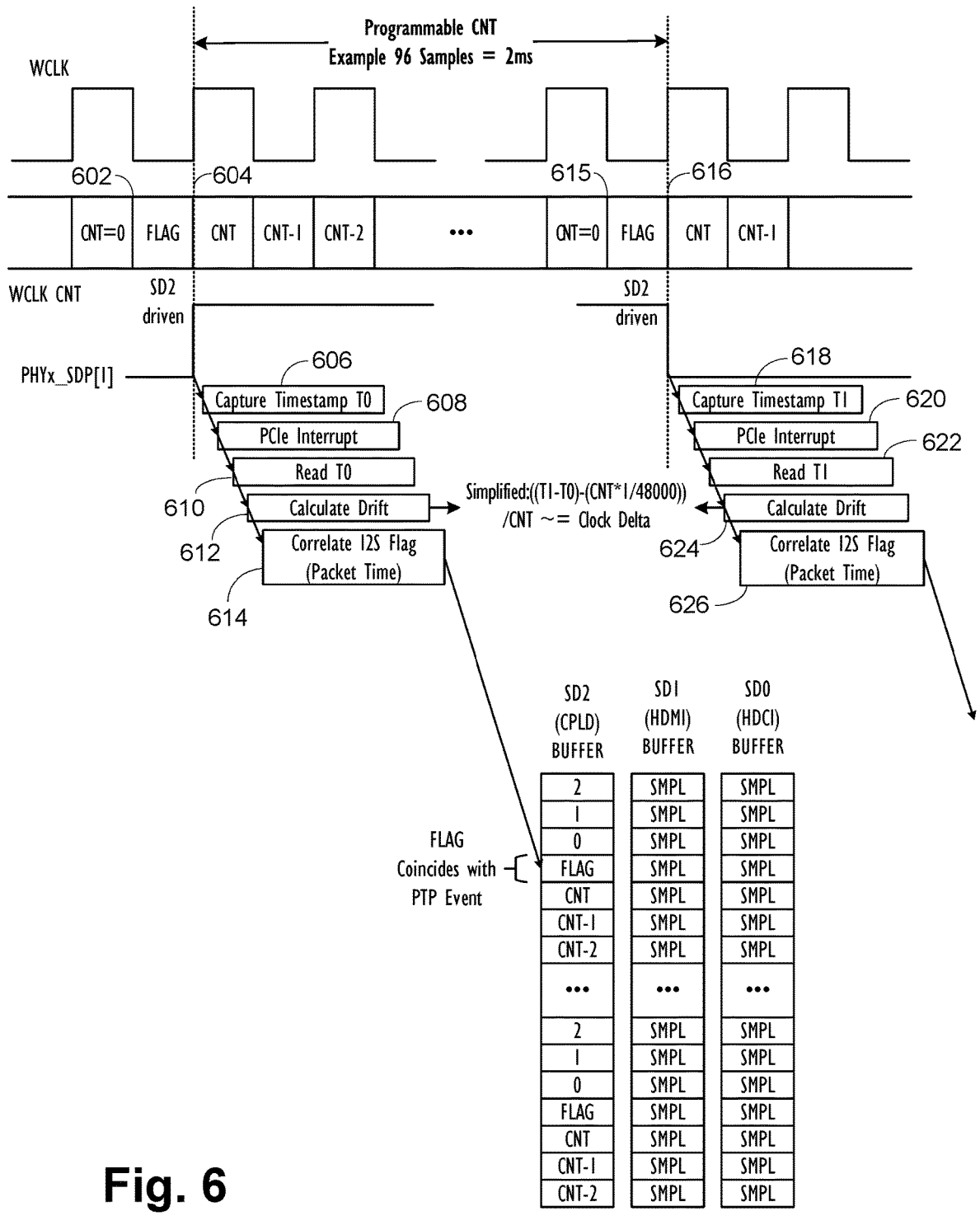
FIG. 6 is a detailed timing diagram illustrating PTP timestamp capture and audio time synchronization according to the present invention.

Referring now to FIGS. 5 and 6, details on PTP timestamp capture are provided. This provides a highly accurate mechanism to correlate the internal audio time base of the SOM 202 with the PTP clock reference used by the Ethernet/IP audio peripherals in order to dynamically derive coefficients for the software resampler or ASRC in the PTP module 241. The PTP time base is not exposed outside the I210-AT controllers but event generation and timestamp capture facilities of the I210-AT controllers are used to provide the required information.

The Open-Q 835 embodiment can only operate in I2S Master Mode with its internal clock providing the I2S time base. The CPLD 231 receives a 9.6 MHz audio reference clock (AUDCLK) from the SOM 202 as the audio base clock. The CPLD 231 generates a 24.576 MHz using a PLL for internal use. The CPLD 231 also provides a copy of the 9.6 MHz reference to the WCD9335 audio codec 230. Thus, all onboard audio clocks have a fundamental relationship to a 19.2 MHz base clock from which all SOM 202 timing is derived. The entire audio subsystem operates at a 48 KHz sample rate.

To facilitate an accurate derivation of the Audio/PTP clock error and skew or correlation, an audio sample counter 502 is contained in the CPLD 231, though it can be in another hardware element. The audio sample counter 502 is driven by the I2S sample clock, WCLK clock, also known as the LRCLK. The audio sample counter 502 is an n-bit programmable down counter which decrements at the rising edge of the 48 KHz audio sample clock from the SOM 202. When the audio sample counter 502 underflows from 0 to 0x7FFh, the audio sample counter 502 reloads a count value, such as 94 and acts as a pulse generator by toggling the output pin connected to the SDP1 inputs on the two NICs 232A, 232B; driving the SD2 input of the SOM 202 with a sample having a flag value and resuming the down count. Since the audio sample counter 502 is dependent on the underflow condition, it should be loaded with N−2 for the desired count, such as 94 for a 96-sample count value.

The NICs 232A, 232B are configured to capture a PTP timestamp based on an external level change event on the SDP1 input. This timestamp is latched into one of the two Aux timestamp registers and the NIC 232A, 232B generates a PCIe Interrupt. PTP module W then reads the AUX PTP register and determines the amount of PTP time which has elapsed over the sample count interval. The PTP module 241 then checks the audio sample buffer for the SD2 queue for the flag-valued sample. The PTP module 241 also checks the audio sample buffer for Ethernet/IP samples having a PTP timestamp of the captured PTP timestamp value. As the flag-valued sample in the SD2 queue was generated at the time of the PTP timestamp capture, the Ethernet/IP sample with that timestamp and the SD2 sample with the flag value occurred at the same time and the difference in the queue locations in the audio sample buffer is the misalignment between the I2S and Ethernet/IP audio samples. This misalignment allows the correlation of the I2S and Ethernet/IP audio samples by the AEC module 238.

The error/drift between the PTP Time reference and local audio clock is derived by comparing sequential timestamp values over the sample interval. The resampler in the PTP module 241 then makes the appropriate adjustments. For the Open-Q 835 embodiment, the resampler in the PTP module 241, which is acting as an ASRC, adds a new audio sample, properly interpolated, or drops an audio sample in the I2S audio sample queues, as appropriate, thus realigning the next sample in the I2S audio sample queues with the Ethernet/IP samples, and also adjust the ASRC coefficients as necessary. For the Jetson TX embodiment, the resampler in the PTP module 24 adjusts the external PLL to synchronize the PLL to PTP time. to the audio base clock (PLL) or ASRC coefficients. Since both NICs 232A, 232B receive the same trigger event, Ethernet/IP Audio devices can potentially be split across network interfaces, allowing devices such as an IP speakerphone that supports PTP on the corporate LAN 118 to interoperate with Ethernet/IP microphones on the local LAN 235.

This operation is shown in timeline format in FIG. 6. In the embodiment of FIG. 6, PTP sample events occur the known period of every 2 milliseconds, which is a WLCK count of 96, so the CNT value is 94. At time 602 the audio sample counter 502 underflows, creating a flag for the PTP event. The SD2 input of the SOM 202 is driven by the CPLD 231. On the rising WCLK edge at time 604, the SDP1 inputs of the NICs 232A, 232B are driven high. This causes each NIC 232A, 232B to capture the PTP timestamp in step 606 and drive a PCIe interrupt in step 608. The PTP module W reads the PTP timestamp for this sample T0 in step 610. In step 612, the PTP module 241 calculates the clock drift between PTP time and local time. This operation is described with respect to sample T1 below. In step 614 the PTP module 24 performs the operation described above to correlate the flag-valued sample in the SD2 queue with the captured PTP timestamp Ethernet/IP sample.

At time 615 the audio sample counter 502 again underflows, creating the flag for the next PTP event, and a flag is inserted into the SD2 stream. At time 616 the SDP1 inputs are toggled, causing the NICs 232A, 232B to capture the PTP timestamp in step 618. In step 620 the PCIe interrupt is driven and in step 622 the PTP module W reads the T1 timestamp. In step 624 the clock drift is calculated. In simplified format, the clock drift equation is:

$$ClockDrift \sim = \frac{\left((T_1 - T_0) - \left(\frac{CNT}{48,000}\right)\right)}{CNT}$$

Using the results of this equation, the resampler in the PTP module 241 operates as described above where audio samples are added or dropped and ASRC coefficients revised or the external PLL is returned. In the case of audio clock adjustment to better align the audio clock and the PTP clock, the exemplary hardware has +/−1 ppm limit, while AEC requires 0.1 ppm or better. For better longer-term average accuracy, a 100 ms timer can be used to adjust the resampler ASRC or external PLL over a 10 second of period, so that is 100 times ((10*1000)/100=100) of adjustment. For example, to get +10.56 ppm adjustment accuracy over 10 seconds of time, do 56 times of u ppm and 44 (100−56=44) times of 10 ppm. As the audio is an ongoing stream, these clock drift operations occur at each underflow or flagged period, using the prior operation PTP timestamp as the new T0 value.

According to real-time performance testing, audio clock synchronization accuracy is better than 0.1 ppm.

In step 626 the I2S samples are again correlated with the Ethernet/IP samples to maintain audio sample correlation of the I2S microphone inputs associated with any directly connected cameras with the Ethernet/IP microphone inputs, which are synchronized with PTP. The audio samples from the Ethernet/IP microphones contain a PTP timestamp, allowing them to be correlated easily. This allows the AEC module 238 to properly use all of the various digital microphone inputs in the AEC operation.

The above description was based on Ethernet/IP microphones connected only to one LAN, either the local LAN 235 or the corporate LAN 118. With some additional steps by the PTP module 241, the mechanism described above correlates PTP time between the local LAN 235 and the corporate LAN 118. Because the audio synchronization event of driving the SDP1 inputs is propagated to both NICs 232A, 232B, if IP microphones are present on both the local LAN 235 and the corporate LAN 118, steps 610 and 622 are performed for each NIC 232A, 232B and the correlation to the I2S flag-valued sample of steps 614 and 626 is performed for each captured PTP timestamp.

The above has described correlating internal audio time developed from the clocks of the SOM 202 with PTP for AEC operation. As discussed above, in the Open-Q 835 embodiment the audio codec is a WCD9335, which does not have guaranteed sample phase or buffer alignment correlation with the I2S inputs, which have been synchronized to PTP time as discussed above. To facilitate identifying the buffer boundaries, the CPLD 231 generates a signal to Analog Input 5 (AIN5) of the WCD9335 audio codec 230. It takes one of two approaches. A simple pulse/edge or a simple low frequency analog audio input whose zero crossing is aligned with the PTP sample transition from the CPLD 231 and the providing of the flag-valued sample to the SD2 input of the SOM 202.

Figure 7:
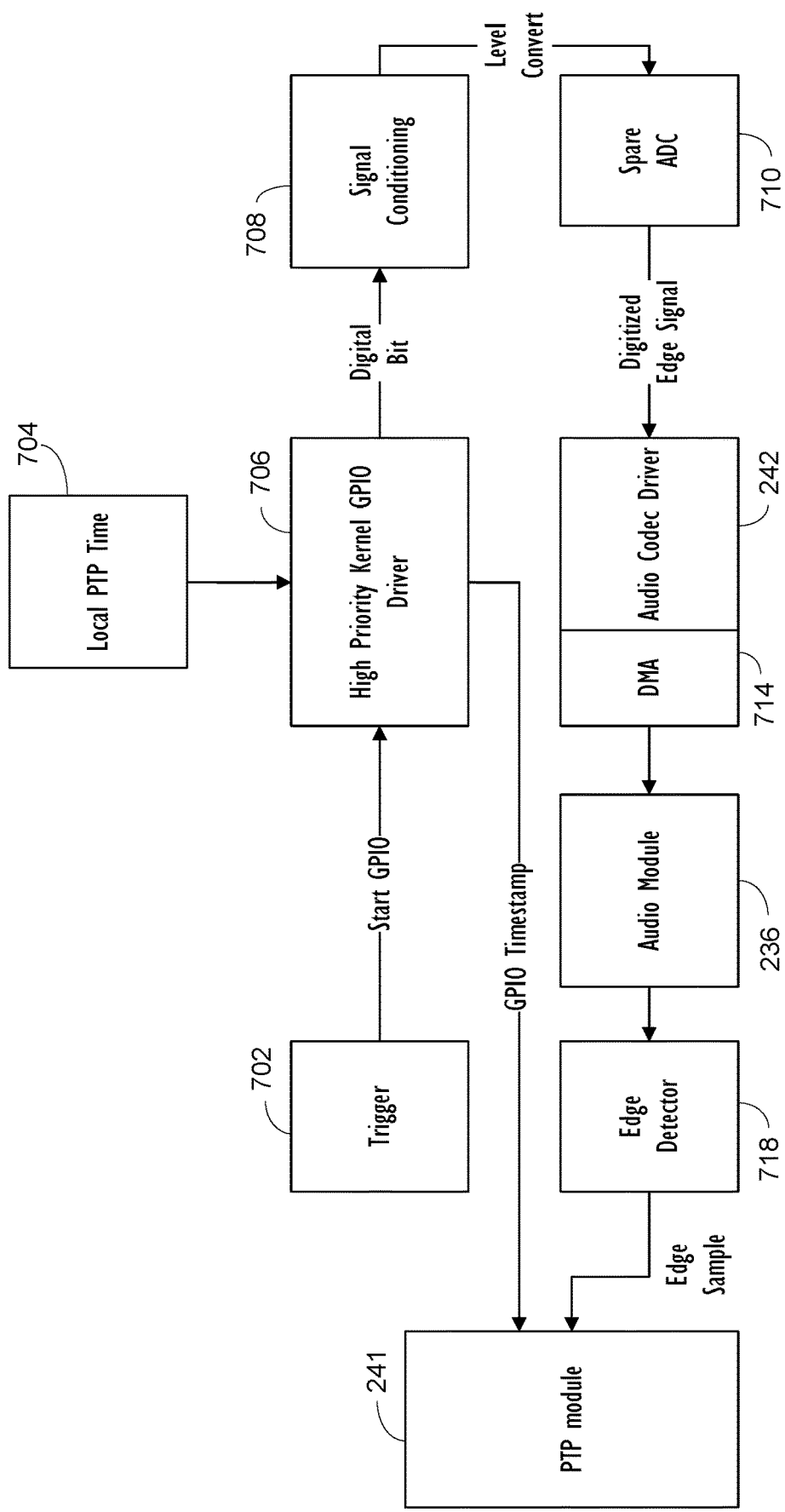
FIG. 7 is a block diagram of blocks and signals used to determine the PTP time versus the audio time for an analog audio signal according to the present invention

If the CPLD 231 is not available, a general GPIO pin that is connected to an analog input, such as AIN5 of the WCD9335 audio codec 230, can be used. Referring to FIG. 7, in step 702a user space software module in the PTP module 24 periodically triggers the beginning of the time stamping process. In step 706 a high priority kernel GPIO driver, also part of the PTP module 241, samples the local PTP time 704 and changes the state of the GPIO pin. The processing latency and jitter of this driver is preferably very low so that the sampled local PTP time is very close to the true PTP time when the GPIO pin state changes.

The signal from the CPLD 231 or the GPIO pin is provided to signal conditioning 708 so that the signal can be digitized by the analog input. The conditioned signal is provided to the analog input in 710, where it is treated as a normal microphone input and an audio sample packet is provided by the audio codec 230. The digital audio sample provided over the SLIMbus to the SOM 202 will change from a zero level to a non-zero level in the sample following the generation of the signal to the WCD9335 audio codec 230. The audio codec driver 242 and a DMA controller 714 in the SOC 204 receive the sample and transfer it to a SLIMbus queue in the audio sample buffer. The audio module 236 obtains the various received audio samples for analysis and operations. An edge detector 718 in the audio module 236 detects the sample containing the signal from the CPLD 231 or the GPIO pin.

For an embodiment with the CPLD 231, the PTP module W determines the location of the flag-valued sample in the SD2 audio sample queue, which was provided at the time of the analog value to the audio codec 230. The PTP module 241 determines the location of the non-zero sample in the appropriate SLIMbus audio sample queue. The difference between the flag-valued sample and the non-zero sample is the delay time of the audio codec 230, so that difference is used to correlate the SLIMbus audio samples to the I2S audio samples for use by the AEC module 238. As the Ethernet/IP audio samples are correlated to the I2S audio samples, the audio codec 230 are then also correlated to the Ethernet/IP audio samples.

For an embodiment using the GPIO pin, the PTP module 241 determines the location of the non-zero sample from the audio codec 230 and checks an equivalent location in the Ethernet/IP audio sample queue. The PTP time in the sample at the equivalent location in the Ethernet/IP audio sample queue is compared to the sampled local PTP time value. The difference is the delay time of the audio codec 230, so that difference is used to correlate the SLIMbus audio samples to the Ethernet/IP audio samples for use by the AEC module 238. As the Ethernet/IP audio samples are correlated to the I2S audio samples, the audio codec 230 are then also correlated to the I2S audio samples.

With either embodiment, the audio time of receipt of sounds by the WCD9335 audio codec 230 can then be correlated with receipt of signals by the locally connected digital audio devices and the Ethernet/IP-connected audio devices by the PTP module 241 or the AEC module 238.

With all of the audio sample buffer positions, internal I2S, PTP and WCD9335, correlated, the AEC module 238 aligns the audio samples from each microphone input, be it an IP microphone, a digital microphone associated with a directly connected camera or an analog microphone that is directly connected, and can reliably and accurately perform the AEC operations.

Figure 8:
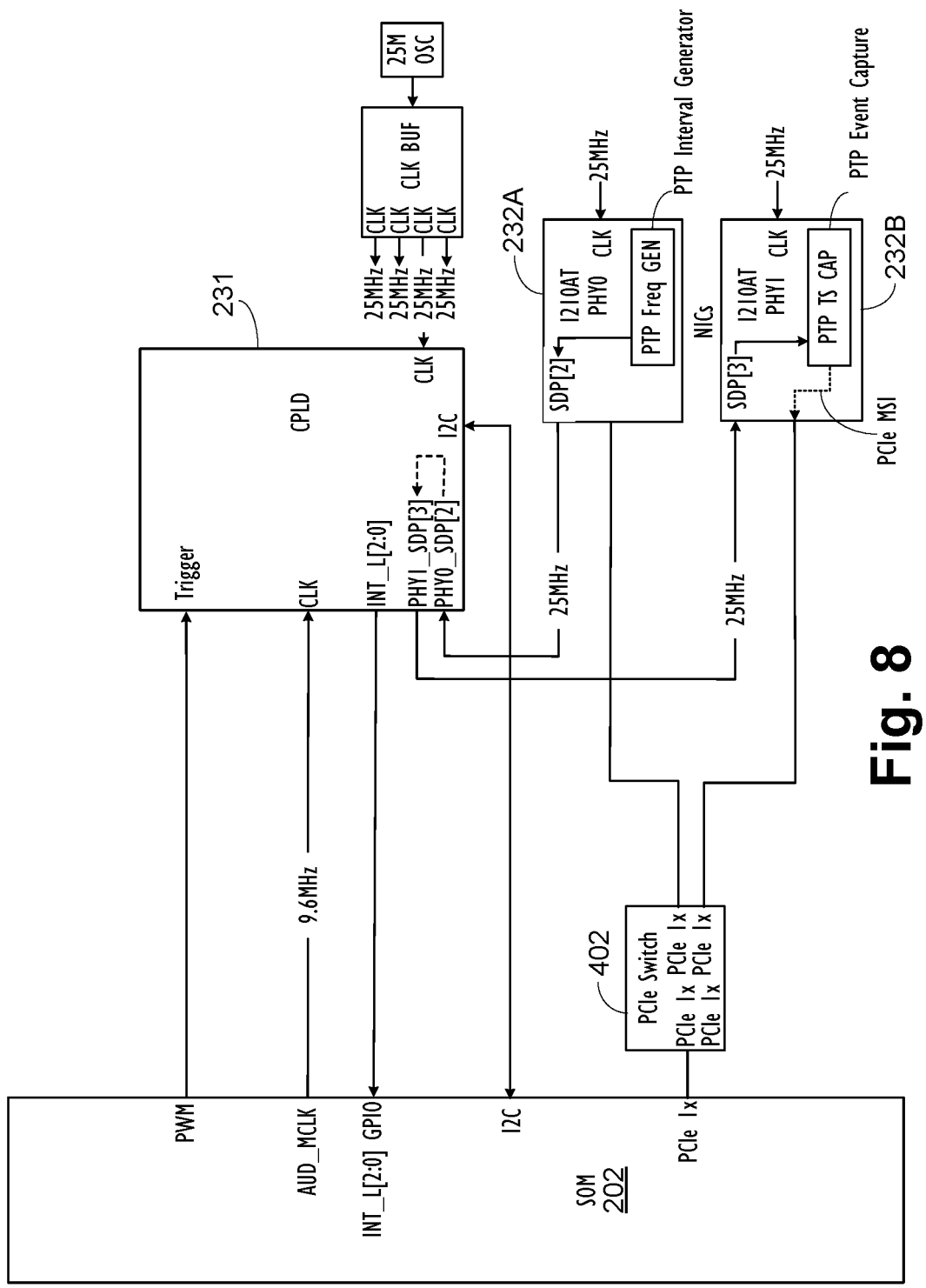
FIG. 8 is a portion of FIG. 4, illustrating PTP timestamp capture according to the present invention.
Figure 9:
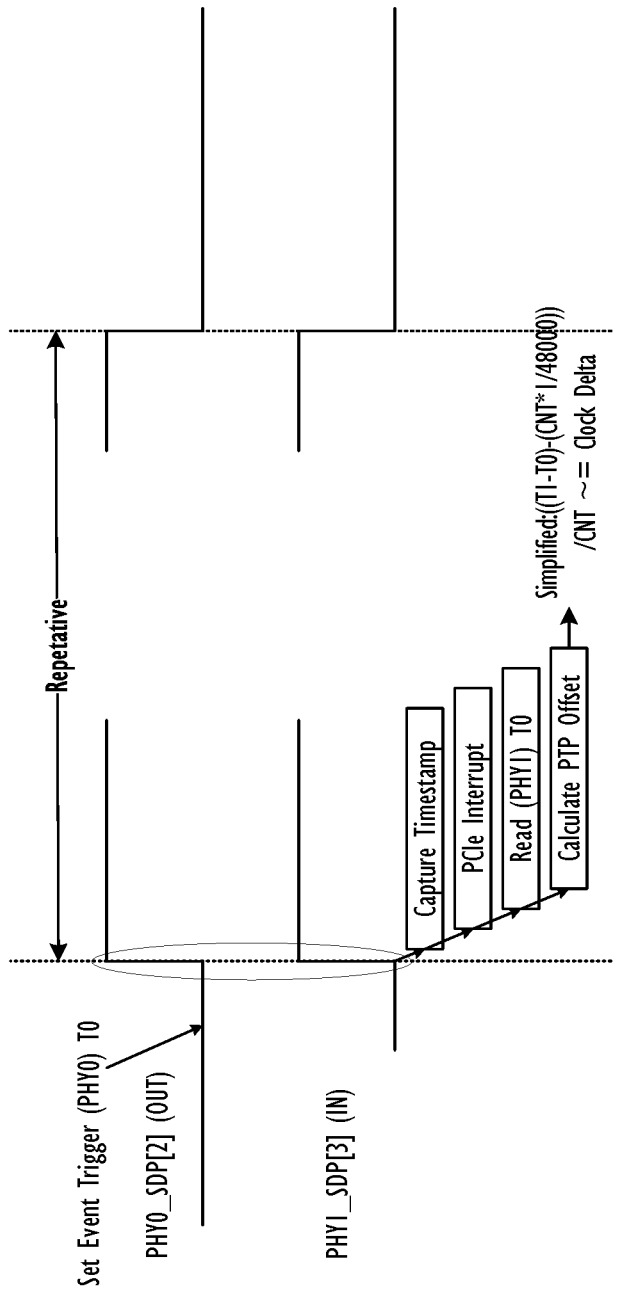
FIG. 9 is a timing diagram illustrating PTP timestamp synchronization according to the present invention.

Referring to FIGS. 8 and 9, the CPLD 231 also provides a facility whereby one NIC can send a timestamp capture event to the other NIC, decoupling cross network PTP time synchronization from the audio synchronization process. This is useful when the processing unit 102 is not acting as the PTP Master.

This approach is done in the CPLD 231 by cross-wiring the SDP2 and SDP3 pins between NICs 232A and 232B and utilizing the Aux TS 2 register. In this embodiment, the SDP2 pin of PHY0, which is NIC 232A, is programmed as an output set to transition based on a PTP time. The SDP3 pin of PHY1, which is NIC 232B, is programmed as a PTP timestamp event capture input as done above. When the pre-programmed time occurs, the SDP2 output of NIC 232A transitions and forces a PTP timestamp capture on NIC 232B. The time values are compared and correlated/corrected as done above.

By utilizing PTP timestamps and correlating them with internal audio time and timestamps and buffer positions, Ethernet/IP audio devices can be closely aligned with local digital audio devices, such as I2S devices, to allow improved AEC operations. By performing repetitive PTP timestamps based on local audio time, drift between PTP time and local audio time can be determined and corrected. By performing the PTP to local audio time operations on each independent Ethernet network, the Ethernet/IP audio devices can be split between independent LANs. If some local digital audio inputs are not aligned with other local digital audio inputs, such as local digital audio inputs formed from analog inputs not aligned with I2S inputs, signals can be provided in analog format and compared with PTP timestamps or I2S audio sample buffer locations of the signals to allow these audio inputs to be correlated to local audio time, and thus also PTP time. With these various correlations performed as necessary based on the various audio inputs in use, high quality AEC operations can be performed as time skews are less than the 0.1 ms needed.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A conferencing endpoint comprising:
a processor for executing programs to perform conferencing endpoint operations;
memory coupled to the processor for holding programs executed by the processor;
a first Ethernet controller coupled to the processor and for coupling to at least one Ethernet-connected microphone, the first Ethernet controller including precision time protocol (PTP) capabilities and providing audio samples;
an audio input module coupled to the processor and for coupling to a locally connected audio source and for receiving audio samples;
a pulse generator connected to the audio input module and the first Ethernet controller to cause the first Ethernet controller to capture a first PTP timestamp and the audio input module to receive a flagged audio sample; and
flash memory storing programs executed by the processor to perform acoustic echo cancellation operations, to obtain the first PTP timestamp, to correlate the audio input module flagged audio sample to a first Ethernet controller audio sample at the first PTP timestamp, to correlate audio samples of locally connected audio sources and Ethernet-connected microphones coupled to the first Ethernet controller and to use the correlation in acoustic echo cancellation operations.

2. The conferencing endpoint of claim 1, wherein the pulse generator further causes the first Ethernet controller to capture a second PTP timestamp a known period after the first PTP timestamp, and
wherein the memory further stores programs executed by the processor to obtain the second PTP timestamp and use the first and second PTP timestamps to develop a clock drift value and to use the clock drift value to adjust audio samples and to synchronize PTP time and a local audio time base.

3. The conferencing endpoint of claim 1, wherein the audio input module includes a digital input portion for coupling to a locally connected digital audio source, and
wherein the digital input portion uses a local audio time base.

4. The conferencing endpoint of claim 3, further comprising:
an audio codec coupled to the audio input module for providing audio samples and for coupling to a locally connected analog audio source,
wherein the pulse generator is further connected to the audio codec to provide a signal that is received by the audio codec to cause the audio codec to provide a non-zero audio sample to the audio input module, and
wherein the memory further stores programs executed by the processor to correlate audio samples from the audio codec with audio samples of any locally connected audio sources and Ethernet-connected microphones and to use the correlation in acoustic echo cancellation operations.

5. The conferencing endpoint of claim 1, further comprising:
an audio codec coupled to the audio input module for providing audio samples and for coupling to a locally connected analog audio source,
wherein the pulse generator is further connected to the audio codec to cause the audio codec to provide a non-zero audio sample to the audio input module, and wherein the memory further stores programs executed by the processor to correlate audio samples from the audio codec with audio samples of any locally connected audio sources and Ethernet-connected microphones and to use the correlation in acoustic echo cancellation operations.

6. The conferencing endpoint of claim 1, further comprising:
a second Ethernet controller coupled to the processor and for coupling to at least one second Ethernet-connected microphone, the second Ethernet controller including PTP capabilities and providing audio samples,
wherein the pulse generator is connected to the second Ethernet controller to cause the second Ethernet controller to capture a second PTP timestamp in conjunction with causing the first Ethernet controller to capture the first PTP timestamp; and
flash memory further storing programs executed by the processor obtain the second PTP timestamp, to correlate the audio input module flagged audio sample to a second Ethernet controller audio sample at the second PTP timestamp, to correlate audio samples of locally connected audio sources and any Ethernet-connected microphone coupled to the second Ethernet controller and to use the correlation in acoustic echo cancellation operations.

7. The conferencing endpoint of claim 1, wherein the audio input module provides a clock and further comprising a hardware element coupled to the audio input module and containing a counter operating on the clock provided by the audio input module, the counter forming at least a portion of the pulse generator.

8. A method of operating a conferencing endpoint, the method comprising:
causing a first Ethernet controller to capture a first precision time protocol (PTP) timestamp and provide audio samples and an audio input module to receive a flagged audio sample and audio samples from locally connected audio sources;
obtaining the first PTP timestamp;
correlating the audio input module flagged audio sample to a first Ethernet controller audio sample at the first PTP timestamp;
correlating audio samples of locally connected audio sources and Ethernet-connected microphones based on correlating the flagged audio sample to the audio sample at the first PTP timestamp; and
using the correlation in acoustic echo cancellation operations.

9. The method of claim 8, further comprising:
causing the first Ethernet controller to capture a second PTP timestamp a known period of local audio time after the first PTP timestamp;
obtaining the second PTP timestamp;
using the first and second PTP timestamps to develop a clock drift value; and
using the clock drift value to adjust audio samples and to synchronize PTP time and a local audio time base.

10. The method of claim 8, wherein the locally connected audio source is a digital audio source.

11. The method of claim 10, further comprising:
providing audio samples of a locally connected analog audio source from an audio codec to the audio input module;
providing a signal that is received by the audio codec to cause the audio codec to provide a non-zero audio sample;

correlating audio samples from the audio codec with audio samples of any locally connected sources and Ethernet-connected microphones; and
using the correlation in acoustic echo cancellation operations.

12. The method of claim 8, further comprising:
providing audio samples of a locally connected analog audio source from an audio codec to the audio input module;
providing a signal that is received by the audio codec to cause the audio codec to provide a non-zero audio sample;
correlating audio samples from the audio codec with audio samples of any locally connected audio devices and Ethernet-connected microphones; and
using the correlation in acoustic echo cancellation operations.

13. The method of claim 8, further comprising:
causing a second Ethernet controller to provide audio samples and to capture a second PTP timestamp in conjunction with causing the first Ethernet controller to capture the first PTP timestamp;
obtaining the second PTP timestamp;
correlating the audio input module flagged audio sample to a second Ethernet controller audio sample at the second PTP timestamp,
correlating audio samples any locally connected audio source and any Ethernet-connected microphone coupled to the second Ethernet controller based on correlating the flagged audio sample to the audio sample at the second PTP timestamp; and
using the correlation in acoustic echo cancellation operations.

14. The method of claim 8, further comprising:
providing a clock; and
operating a counter on the clock,
wherein causing the first Ethernet controller to capture a first PTP timestamp and the audio input module to receive a flagged audio sample is based on the counter.

15. A non-transitory processor readable memory containing programs that when executed cause a processor to perform the following method of operating a conferencing endpoint, the method comprising:
causing a first Ethernet controller to capture a first precision time protocol (PTP) timestamp and to provide audio samples;
causing a local audio module to receive a flagged audio sample and audio samples from locally connected audio sources;
obtaining the first PTP timestamp;
correlating the audio input module flagged audio sample to a first Ethernet controller audio sample at the first PTP timestamp;
correlating audio samples of locally connected audio sources and Ethernet-connected microphones based on correlating the flagged audio sample to the audio sample at the first PTP timestamp; and
using the correlation in acoustic echo cancellation operations.

16. The non-transitory processor readable memory of claim 15, the method further comprising:
causing the first Ethernet controller to capture a second PTP timestamp a known period of local audio time after the first PTP timestamp;
obtaining the second PTP timestamp;
using the first and second PTP timestamps to develop a clock drift value; and
using the clock drift value to adjust audio samples and to synchronize PTP time and a local audio base.

17. The non-transitory processor readable memory of claim 15, wherein the locally connected audio source is a digital audio source.

18. The non-transitory processor readable memory of claim 17, the method further comprising:
configuring an audio codec to provide audio samples of a locally connected analog audio source to the audio input module;
providing a signal that is received by the audio codec to cause the audio codec to provide a non-zero audio sample;
correlating audio samples from the audio codec audio samples of any locally connected sources and Ethernet-connected microphones; and
using the correlation in acoustic echo cancellation operations.

19. The non-transitory processor readable memory of claim 15, the method further comprising:
configuring an audio codec to provide audio samples of a locally connected analog audio source to the audio input module;
correlating times of receipt of samples from the audio codec with audio samples of any locally connected sources and Ethernet-connected microphones; and
using the correlation in acoustic echo cancellation operations.

20. The non-transitory processor readable memory of claim 15, the method further comprising:
causing a second Ethernet controller to provide audio samples and to capture a second PTP timestamp in conjunction with causing the first Ethernet controller to capture the first PTP timestamp;
obtaining the second PTP timestamp;
correlating the audio input module flagged audio sample to a second Ethernet controller audio sample at the second PTP timestamp,
correlating audio samples of any locally connected audio source and any Ethernet-connected microphone coupled to the second Ethernet controller based on correlating the flagged audio sample to the audio sample at the second PTP timestamp; and
using the correlation in acoustic echo cancellation operations.

* * * * *